Nov. 9, 1926.

W. W. SCHOLL 1,606,105

SHOCK ABSORBING SPRING CONNECTION

Filed April 15, 1926

Inventor
W. W. Scholl

By Clarence A. O'Brien

Attorney

Patented Nov. 9, 1926.

1,606,105

UNITED STATES PATENT OFFICE.

WILLIAM W. SCHOLL, OF UTLEYVILLE, COLORADO.

SHOCK-ABSORBING SPRING CONNECTION.

Application filed April 15, 1926. Serial No. 102,187.

My present invention has to do with cushioning or shock absorbing means for use in motor vehicles and other vehicles; and its general object is the provision of a simple and efficient shock absorbing spring connection, designed more particularly for incorporation and use to advantage in motor trucks.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
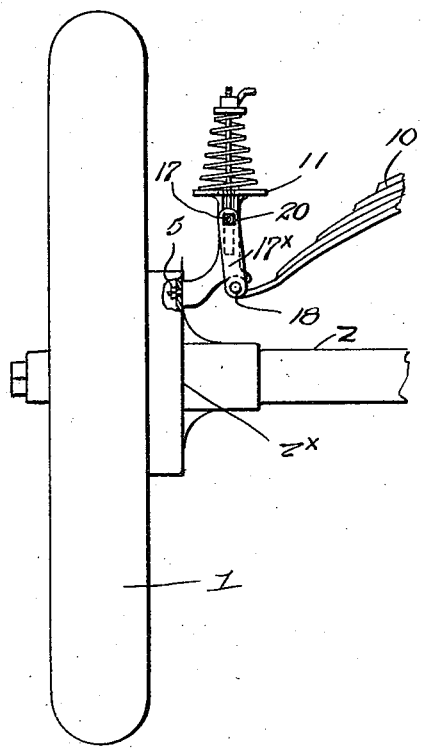
Figure 1 is an elevation illustrating a spring connection constructed in accordance with my invention, in use.

Figure 1 shows the rear left hand side of a well known type of automobile truck, and it will be understood that 1 is a wheel, and 2 an axle housing, a portion 2$^x$ of the latter being used for the attachment of the upright bracket 3 of my improvement. Preferably, though not necessarily, the attachment of the bracket 3 to the housing portion 2$^x$ is effected through the medium of a reduced and threaded portion 4 on the heel end of the bracket extended through an aperture in the housing portion 2 and secured by a nut 5.

Figure 2:
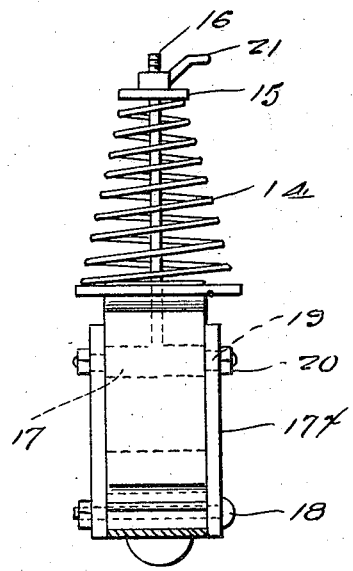
Figure 2 is an enlarged fragmentary view taken at right angles to Figure 1 and showing a portion in section.
Figure 4:
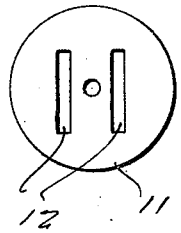
Figure 4 is a detail plan view illustrating the spring supporting plate as superposed upon the shoulders of the said bracket.
Figure 3:
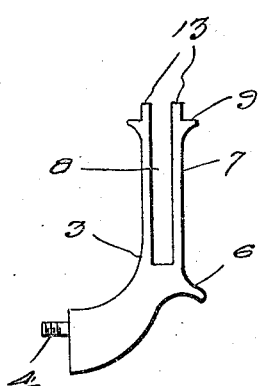
Figure 3 is an elevation, on an enlarged scale, showing the bracket comprised in my improvement.

The heel end of the bracket 3 is designed to bear solidly against the inner side of the housing portion 2$^x$, as appears in Figure 1, and it will be noted that the bracket 3 is characterized by a lip 6 and by an upstanding portion 7 in which is a slot 8 and on which are shoulders 9. A transverse leaf spring 10 is employed, and at this point I would have it understood that in the preferred embodiment of my invention the brackets 3 correspond in width to the spring 10. At 11 is a plate which is slotted at 12, to receive the upper end portions 13 of the bracket 3 and is superposed upon the before mentioned shoulders 9 of the bracket 3. Superimposed, in turn, upon the plate 11 is a spring 14 which is preferably of upwardly tapered type and is designed to absorb shock and jar and cooperate with the spring 10 in increasing the easy riding quality of trucks. Arranged on the upper end of the spring 14 is an apertured plate 15, and extending through the said aperture of the plate 15 is the upright threaded shank 16 of a connecting bolt, said bolt having at the lower end of the shank 16 a T-head 17 arranged and adapted to play vertically in the slot 8 of the bracket 3. Disposed in front and rear of the bracket 3 are shackle irons or links 17$^x$. The said links 17$^x$ are pivotally connected by a pintle 18 with the eye usually provided at the end of the spring 10 and are also pivotally connected to the reduced ends 19 of the T-head 17 and secured thereon through the medium of nuts 20. A tensioning nut 21 is mounted on the upper threaded end portion of the bolt shank 16 and is superimposed upon the plate or washer 15, as appears in Figures 1 and 2.

It will be apparent from the foregoing that my novel shock absorbing spring connection is calculated to assure a truck riding easily when the truck is empty; and in this connection it will be noted that when the truck is loaded, the T-heads 17 of my improvement will be drawn downwardly to the bottom of the slot 8 in the bracket 3 so as to impose the excess load on the spring 10, thereby assuring easy riding of the loaded truck. When the truck is to be employed for carrying an ordinary load, the tensioning nut 21 is turned downwardly so as to cause the head 17 of the bolt to ride or play in the slot 8 of the bracket 3 and so that a portion of the load will be carried on the spring 14.

In addition to the practical advantages ascribed to my improvement, it will be noted that the improvement as a whole is simple and inexpensive in construction and is well adapted to withstand the usage to which automobile parts are ordinarily subjected.

I have entered into a detailed description of the construction and relative arrangement of the parts embraced in the present and preferred embodiment of my invention in order to impart a full, clear and exact understanding of said embodiment. I do not desire, however, to be understood as limiting myself to the specific construction and relative arrangement of parts as disclosed, my invention being defined by my appended claims within the scope of which modifications may be made without departure from my invention.

Having described my invention, what I claim and desire to secure by Letters-Patent, is:—

1. In a shock absorbing spring connection and in combination, a bracket support having an upright slotted portion and also having shoulders on said portion spaced below the upper end thereof, an apertured plate receiving the upper end portion of the bracket and superimposed on the shoulders thereof, a shock absorbing spring superimposed upon said plate, a plate superimposed upon said shock absorbing spring, a bolt having a shank extending through the said plate and also having a T-head disposed and adapted to play in the slot of the bracket, a main spring, links disposed at opposite sides of the bracket and connecting one end of the main spring and the ends of the T-head of the bolt, and a tensioning nut mounted on the threaded portion of the bolt and disposed above the upper plate.

2. In a shock absorbing spring connection and in combination, a bracket support having an upright slotted portion and also having shoulders on said portion spaced below the upper end thereof, an apertured plate receiving the upper end portion of the bracket and superimposed on the shoulders thereof, a shock absorbing spring superimposed upon said plate, a plate superimposed upon said shock absorbing spring, a bolt having a shank extending through the said plate and also having a T-head disposed and adapted to play in the slot of the bracket, a main spring, links disposed at opposite sides of the bracket and connecting one end of the main spring and the ends of the T-head of the bolt, and a tensioning nut mounted on the threaded portion of the bolt and disposed above the upper plate; the said bracket also having a lip arranged to offer an abutment to the end of the main spring, and the links being pivotally mounted on reduced end of the T-head of the bolt and secured thereon by nuts.

In testimony whereof I affix my signature.

WILLIE W. SCHOLL.